United States Patent [19]

McDonald et al.

[11] Patent Number: 5,108,619

[45] Date of Patent: Apr. 28, 1992

[54] METHOD OF INHIBITING DEPOSITION ON HEAT TRANSFER SURFACES IN BOILERS

[75] Inventors: Alexander C. McDonald, Kemah, Tex.; Fu Chen, Newtown; William S. Carey, Ridley, both of Pa.

[73] Assignee: Betz Laboratories, Inc., Trevose, Pa.

[21] Appl. No.: 643,890

[22] Filed: Jan. 18, 1991

[51] Int. Cl.$^5$ ............................................. C02F 5/10
[52] U.S. Cl. ................................... 210/701; 252/180
[58] Field of Search ............... 210/701, 698; 252/180, 252/181

[56] References Cited

U.S. PATENT DOCUMENTS

| | | | |
|---|---|---|---|
| 2,289,540 | 7/1942 | Dittmar et al. | 260/83 |
| 4,288,327 | 7/1986 | Godlewski et al. | 210/698 |
| 4,301,266 | 11/1986 | Muenster et al. | 526/212 |
| 4,457,847 | 12/1987 | Lorenc et al. | 210/698 |
| 4,530,766 | 7/1987 | Hann et al. | 210/701 |
| 4,710,537 | 12/1987 | Walinsky | 210/701 |

FOREIGN PATENT DOCUMENTS

| | | | |
|---|---|---|---|
| 580658 | 8/1959 | Canada | 210/701 |
| 614685 | 2/1961 | Canada | 210/701 |

OTHER PUBLICATIONS

*Journal of Polymer Science: Part A: Polymer Chemistry,* 1989, vol. 27, Chatterjee et al., pp. 3855-3863.

*Primary Examiner*—Peter Hruskoci
*Attorney, Agent, or Firm*—Alexander D. Ricci; Philip H. Von Neida

[57] ABSTRACT

This invention relates to a method of controlling deposition in steam generating systems. This method utilizes poly(methacrylic) acid polymers that were initiated by benzoyl peroxide or lauroyl peroxide as the treatment agents.

3 Claims, No Drawings

METHOD OF INHIBITING DEPOSITION ON HEAT TRANSFER SURFACES IN BOILERS

FIELD OF THE INVENTION

The present invention pertains to the treatment of boiler water systems with polymers that were initiated by benzoyl peroxide and lauroyl peroxide. More particularly, this invention relates to the novel use of poly(methacrylic) acid polymers that were initiated by benzoyl peroxide and lauroyl peroxide to treat boiler water systems.

BACKGROUND OF THE INVENTION

As described comprehensively in U.S. Pat. No. 4,288,327 the deposition of solids onto heat transfer surfaces of steam generating equipment is a major problem. Common contaminants in boiler feed-water that can form deposits are calcium and magnesium salts, carbonate salts, sulfite, phosphate, siliceous matter and iron oxide. Any foreign matter that is introduced into the boiler in insoluble or particulate form will tend to form deposits on the heat transfer surfaces. These formations will decrease the efficiency under which the heat transfer takes place and can lead to over heating, circulation restrictions, damage to the systems, loss of effectiveness, and increased costs due to cleaning, unscheduled outages, and replacement of equipment. In extreme cases, catastrophic tube failure can occur.

Deposit control agents are frequently added to the feedwater of boilers. Their ultimate objective is to inhibit the formation of deposits on the heat transfer surface sand to facilitate the removal of any deposits in the blowdown. This is accomplished via two mechanisms: a solubilization mechanism, where chelants, or chelant-type molecules, form soluble complexes with the deposit-forming species which are removed in the blowdown; and, an adsorption mechanism, where the deposit control agent adsorbs on the surface of the particulate matter and either inhibits the formation of the deposit, or disperses the deposit that is being formed, and makes it more readily removable.

Phosphates, chelants and polymeric dispersants are frequently used in various combinations in boiler treatment programs. The phosphate is used to precipitate hardness or iron species; the chelants have the ability to complex and prevent the deposition of many cations under boiler water conditions. In higher pressure boilers phosphate is also used for pH control, and since it maintains the system at a pH where corrosion in minimized, it also acts as a corrosion inhibitor. Polymers are used to disperse particulate matter, either the precipitate formed with phosphate treatment, or solid or colloidal matter already present. To some extent, polymers can also act as chelants to solubilize cations.

Polymers that have been used in boiler water treatment include naturally occurring products such as lignosulfonic acids and carboxymethylcelluloses. Synthetic anionic polymers are the more preferred materials recently, and include carboxylated polymers, sulphonated polymers, and polyphosphonic acids. Copolymers incorporating combinations of the above functionalities are also used. Examples of effective synthetic polymers are sulfonated styrene, polymaleic acid or anhydride, copolymers of sulfonated styrene and maleic anhydride. Nonionic polymers do not appear to be effective dispersants in boiler water treatment.

In the use of polymeric dispersants, the polymers are fed to maintain a bulk concentration, which is many times higher than the effective amount of polymer needed for adsorption on the surfaces of the particulate matter or the heat transfer surface. That is, the concentration of polymer on the surface is not only determined by the affinity of the polymer for the surface, but also the equilibrium between the adsorbed species and the bulk species. Thus, where a treatment program might utilize 50 to 100 ppm of a polymeric dispersant, only 1 to 10 ppm of active species might be necessary if the polymer could more effectively be brought into contact with the surfaces in question. The excess dispersant can also contribute to the impurities in the boiler and in the steam produced dispersants can degrade under boiler conditions, leading to organic materials which can be present in the steam, affecting its purity.

In many boiler designs, heat fluxes are not uniform throughout the entire unit due to design miscalculations. It is known that deposit weight densities (DWD) (a measure of amount of boiler deposition) increase as heat fluxes increase, approximately as the square of the heat flux. This non-uniformity in heat transfer can lead to "hot spots" in a boiler where the heat flux can be as much as five times the average heat flux. These hot spots are predisposed to failure. It is often the case that even in an effectively treated boiler there will still be many tube failures in these areas of high heat flux.

GENERAL DESCRIPTION OF THE INVENTION

The present inventors discovered that carboxylated polymers are effective in inhibiting deposits and dispersing existing deposits in steam generating systems in contact with an aqueous medium.

The specific carboxylated polymers are those that have been produced by polymerizing a monomer utilizing an initiator of either benzoyl peroxide or lauroyl peroxide. The resulting poly(methacrylic acid) (PMS) polymers incorporate benzoyl or lauroyl groups on the polymer.

It has been found that the polymers produced in this fashion are more efficacous in controlling deposits in boilers than carboxylated polymers initiated by another fashion.

The use of benzoyl peroxide and lauroyl peroxide as polymerization initiators is well known in the art. S. K. Chatterjee et al., in Journal of Polymer Science: Part A: Polymer Chemistry, Vol. 27, 3855-3863 (1989) describes the synthesis of poly(methacrylic) acid with benzoyl peroxide as the initiator in an aqueous solvent. Poly(acrylic acid) which was synthesized by benzoyl peroxide is commercially available as Goodrite K-732.

Accordingly, it is an object of the present invention to provide a polymer of poly(methacrylic) acid that is produced by initiating a monomer by benzoyl peroxide or lauroyl peroxide that has enhanced activity in boiler water treatment compared to poly(methacrylic) acid that was initiated in another fashion.

Other and further objectives and advantages will be apparent from the specification.

DESCRIPTION OF THE RELATED ART

U.S. Pat. No. 4,530,766 (Hann et al.) discloses a method of dispersing hardness ion salt scale in aqueous systems using a copolymer of acrylic acid/methacrylic acid. This patent teaches the use of these copolymers in a specific molecular weight range. The present invention is directed to a method of inhibiting deposition on steam generating surfaces using polymers of poly(methacrylic) acid initiated by benzoyl or lauroyl peroxide. There is no suggestion in Hann et al. to employ these polymerization initiated polymers to inhibit deposition.

U.S. Pat. No. 4,457,847 (Lorenc et al.) discloses a method of treating hardness in boiler waters with a water-soluble sequestrant anionic vinyl polymer containing at least 30% by weight of carboxylate functionality. This polymer can be a homopolymer of methacrylic acid or acrylic acid, however there is no suggestion in Lorenc to employ benzoyl or lauroyl peroxide as the polymerization initiator.

U.S. Pat. No. 4,301,266 (Muenster et al.) teaches a method of making acrylic and methacrylic acid in isopropanol or a water/isopropanol mixture.

U.S. Pat. No. 2,289,450 (Dittmar et al.) teaches a method of producing a polymer of an organic acid such as methacrylic acid that is more soluble in water using peracids and their salts. Benzoyl peroxide is taught as a polymerization catalyst to compare polymer viscosity with that of the peracid initiated polymers.

DETAILED DESCRIPTION OF THE INVENTION

The present invention is directed towards the use of specific carboxylated polymers that are effective in inhibiting deposits and dispersing existing deposits in steam generating systems in contact with an aqueous medium.

Specifically, this invention is directed to a method of controlling the formation and deposition of materials including soluble salts of iron, calcium and magnesium on the structural parts of a steam generating system containing an aqueous medium, which materials would deposit and/or form and deposit under steam generating conditions, which method comprises adding to said aqueous medium a sufficient amount for the purpose of a dispersant comprised of a carboxylated polymer.

The specific carboxylated polymers are those that have been produced by polymerizing a monomer utilizing an initiator of either benzoyl peroxide or lauroyl peroxide. The resulting poly(methacrylic acid) (PMA) polymers incorporate benzoyl or lauroyl groups on the polymer.

The inventors anticipate that poly(maleic) acid that has been produced by initiating with benzoyl peroxide or lauroyl peroxide would also be effective in the present invention.

The effectiveness of a given polymer to act as a threshold inhibitor or as a particle dispersing agent is determined primarily by three factors. These include the number of carboxylic acid groups per polymer unit chain length; the hydrophobic character of the polymer; and the strength of interaction between the polymer function groups and the dispersing surfaces.

The dispersion and deposit inhibition action of carboxylated polymers has been developed from the results of autoclave and research boiler testing. The carboxylated polymers disperse and inhibit the deposition of solids in aqueous systems by way of two modes of action. The first mode is threshold inhibition whereby the polymers act as weak chelating agents to solubilize cation species (such as $Fe^{+2}$, $Fe^{+3}$, $Ca^{+2}$, $Mg^{+2}$, etc.) and inhibit their precipitation to form particles. The second mode is the dispersion of particulates whereby the polymers adsorb onto particle and heat transfer surfaces and inhibit flocculation and adhesion.

It has been shown that for carboxylated polymers, such as PMA, threshold and particle dispersion are mutually exclusive and cannot be achieved to levels of effectiveness on the same molecule. Further, the two modes of action cannot be combined in a copolymer. The copolymerization of methacrylic acid with a hydrophobic polymer increases surface activity while decreasing the threshold inhibition activity due to the reduction in the number of functional groups along the polymer length.

The amount of initiator employed can have a varied range. In theory the range can span from ppm of initiator to weight percent initiator. This range is limited by the solubility of the initiator in the particular solvent system utilized. The preferred range in the present invention is one to four percent.

The incorporation of the benzoyl or lauroyl group on the polymer improves the activity of a polymer dispersant by at least two mechanisms. First, the increased hydrophobicity increases the adsorption of the polymer onto surfaces which increases the surface activity of the polymer. Secondly, the lifetime of the polymer in the harsh, high-temperature, high pressure environment of a boiler is increased due to the greater thermal and chemical stability provided due to the incorporation of the benzoyl or lauroyl group.

The polymer can be fed from 1.0 to 1000 ppm active of boiler water with 5.0 to 100 ppm active polymer in the boiler water preferred. Specific dosages are determined by the conditions existing in the particular boiler system.

The present invention can be applied in a boiler water treatment program with many other commonly used treatment agents. These can include but are not limited to: neutralizing or filming amines; oxygen scavengers; corrosion inhibitors; and the like.

The inventive polymers can be applied to the boiler directly or in the boiler feedwater depending upon the treatment desired. The polymers are not affected by the pH of the system, and will be effective at any boiler pH that is used in the industry.

All of the experiments described were performed with PMA produced by various initiation techniques.

The invention will now be further described with respect to a number of specific examples which are to be regarded solely as illustrative, and not as restricting the scope of the invention.

SYNTHESIS OF THE POLYMERS

Toluene is charged to a suitable reactor and heated to the desired reaction temperature. Upon achieving the desired temperature, the initiator is shot fed to the reactor and a one hour drop-wise addition of the monomer is initiated. After the addition of the monomer, the batch is held an additional two hours at reaction temperature. During the course of the reaction, the polymer precipitates from the solution as a fluid slurry. This slurry is concentrated in vacuo after the holding period, then is washed with diethyl ether (2×200 ml) isolating the polymer via filtration through a #50 Whatman filter after each washing. The isolated polymer is dried in vacuo, then dissolved in a dilute caustic solution to result in an aqueous polymer solution. Tables I A & B provide a summary of the polymerization conducted. Note that for Sample 6 the initiator was co-fed to the reactor with the monomer.

The structures of the polymers were confirmed by Carbon 13 NMR analysis. The benzoyl peroxide initiated polymers were characterized by a broad multiplet of peaks at approximately 128 ppm down field from external dioxane, consistent with incorporated benzoyl functionality. The lauroyl peroxide initiated polymers were characterized by peaks at 13.4, 22.1, approximately 29 (broad multiplex), and 31.5 ppm downfield from external dioxane, consistent with lauroyl functionality. No residual monomer was detected in any of the samples.

Molecular weight is not critical to the invention, as long as the polymers have been initiated with benzoyl or lauroyl peroxide. Molecular weights can be from about 3000 to about 80,000. The available polymers useful in this invention will have molecular weights that fall in this range.

to form insoluble particulates. Heating for 6 to 8 hours at 1000 psig and 545° C. produces a stable, colloidal suspension of iron oxide with a narrow range of particle size of approximately 0.6 um in diameter. Heating for longer periods causes the colloids to lose stability as the particles aggregate to form larger particles and flocs which fall out of suspension. The effect of polymeric dispersants on the stability and particle size of the iron oxide colloids formed in this manner is the basis of the ADT.

A typical experiment consists of heating the prepared solution while maintaining the autoclave vessel at 1000 psig for 21 hours. The contents of the autoclave are then blown down through a tube-in-shell condenser, passed sequentially through two in line filter holders and the

TABLE I A

| Reference | Monomer (g) | Initiator (g) | Toluene (g) | Reaction Temp. °C. | Initiator Mole % Monomer |
|---|---|---|---|---|---|
| Sample 1 | MAA, 57.1 | BPO, 3.25 | 136.86 | 100 | 2.0 |
| Sample 2 | MAA, 57.1 | BPO, 6.49 | 143.92 | 100 | 4.0 |
| Sample 3 | MAA, 57.1 | BPO, 4.87 | 143.92 | 100 | 3.0 |
| Sample 4 | MAA, 57.1 | BPO, 3.25 | 143.92 | 100 | 2.0 |
| Sample 5 | MAA, 57.1 | LPO, 10.68 | 143.92 | 82 | 4.0 |
| Sample 6 | MAA, 57.1 | LPO, 10.68 | 143.92 | 100 | 4.0 |
| Sample 7 | MAA, 57.1 | LPO, 10.68 | 143.92 | 100 | 4.0 |

MAA = 98% Methacrylic acid
BPO = 97% Benzoyl peroxide
LPO = 97% Lauroyl peroxide
Sample 6 Utilized the initiator co-fed to the reactor with the monomer (10.68 g LPO/45.92 g toluene)
Only 98.0 g toluene was initially charged to the reactor.

TABLE I B

Characterization Summary

| Reference | % Solids | pH | Viscosity (CPS) | Mn | Mw |
|---|---|---|---|---|---|
| Sample 1 | 30.6 | 11.37 | 230.5 | | |
| Sample 2 | 30.0 | 11.65 | 112.2 | 4500 | 16,000 |
| Sample 3 | 30.4 | 9.21 | 152.2 | 4400 | 17,000 |
| Sample 4 | 29.9 | 9.78 | 205.5 | 5600 | 23,000 |
| Sample 5 | 27.4 | 10.21 | 850.0 | 5800 | 27,000 |
| Sample 6 | 26.8 | 11.06 | 435.0 | 4400 | 19,000 |
| Sample 7 | 28.0 | 11.25 | 1483.0 | | |

Mn = Number average molecular weight
Mw = Weight average molecular weight

Testing of these polymers was conducted in two ways: The "Autoclave Dispersion Test" (ADT) and simulated boiler testing in research boilers. These results are presented in Table II, III A&B, IV A, B, C and V.

AUTOCLAVE DISPERSION TEST

The effectiveness of polymers to disperse and suspend iron oxide particles in a high pressure, aqueous solution is determined using the Autoclave Dispersion Test (ADT). The ADT involves the formation of an iron oxide colloidal suspension in the high temperature, high pressure environment of an autoclave.

A one liter solution is prepared containing the following:
0.5 g FeSO$_4$ . 7H$_2$O (100 ppm Fe)
1.5 g Na$_3$PO$_4$ . 12H$_2$O
3.0 g Triethanolamine (TEA)

At room temperature, the TEA forms soluble complexes with the iron. When the solution is heated, the TEA thermally decomposes and iron oxide precipitates filtrate collected. The amount of iron existing in three particle size ranges (greater than 1.2 um, between 0.2 and 1.2 um, and less than 0.2 um) is then determined analytically.

The efficacy of a polymer to disperse iron is determined by the particle size distribution and total amount of iron removed (i.e. total suspended throughout the 21 hour test period) from the autoclave. The amount of iron existing at each particle size range is expressed as a percentage of the total amount of iron removed from the autoclave at the end of the test. For example, the percentage of iron existing as particles less than 0.2 um (A) is calculated as follows:

$$A = 100 \times \frac{a}{a + b + c}$$

where b and c are the mass of iron filtered from the sample stream on the 1.2 um and 0.2 um pore size filter disks and a is the mass of iron contained in the filtrate. The total amount of iron removed from the autoclave is expressed as a percentage of the iron in the autoclave at the beginning of the test.

In general, high percentages of iron existing as small particulates less than 0.2 um and high percentages of total iron removed from the autoclave are indicative of good dispersant performance. Effective iron dispersion may be achieved with both large and small particles.

ADT RESULTS

Summarized in Table II are ADT results for PMA initiated by benzoyl peroxide or lauroyl peroxide (PMA/bp and PMA/lp). Results for PMA (PMA*) initiated by persulfate are shown for comparison.

TABLE II

| Sample | Polymer | ppm | Part >1.2 um | Part >0.2 um <1.2 um | Part <0.2 um | % of Iron Removed |
|---|---|---|---|---|---|---|
| PMA* | PMA | 50.0 | 4.8 | 17.4 | 77.8 | 37.3 |
| PMA* | PMA | 20.0 | 37.0 | 7.9 | 55.2 | 25.4 |
| PMA* | PMA | 7.5 | 30.4 | 13.9 | 55.7 | 27.3 |
| PMA* | PMA | 3.0 | 24.2 | 50.5 | 25.3 | 20.2 |
| Average | | 0.0 | 28.3 | 40.7 | 31.0 | 18.4 |
| Sample 2 | PMA/4% bp | 50.0 | 14.3 | 22.7 | 58.0 | 27.1 |
| Sample 3 | PMA/3% bp | 50.0 | 4.9 | 3.2 | 91.9 | 62.0 |
| Sample 4 | PMA/2% bp | 50.0 | 3.9 | 6.3 | 89.6 | 56.8 |
| Sample 1 | PMA/2% bp | 50.0 | 4.6 | 10.9 | 84.6 | 47.3 |
| Sample 1 | PMA/2% bp | 20.0 | 4.8 | 4.9 | 90.3 | 41.0 |
| Sample 1 | PMA/2% bp | 7.5 | 2.2 | 12.2 | 85.5 | 36.2 |
| Sample 1 | PMA/2% bp | 3.0 | 32.0 | 13.9 | 54.6 | 6.3 |
| Average | | 0.0 | 28.3 | 40.7 | 31.0 | 18.4 |
| Sample 2 | PMA/4% bp | 100.0 | 4.2 | 11.7 | 84.1 | 67.8 |
| Sample 2 | PMA/4% bp | 50.0 | 19.3 | 22.7 | 58.0 | 27.1 |
| Sample 2 | PMA/4% bp | 20.0 | 3.3 | 2.8 | 93.9 | 61.8 |
| Sample 2 | PMA/4% bp | 20.0 | 4.0 | 24.9 | 71.1 | 61.8 |
| Sample 2 | PMA/4% bp | 7.5 | 2.5 | 2.3 | 95.2 | 48.4 |
| Sample 2 | PMA/4% bp | 3.0 | 4.5 | 16.9 | 78.6 | 22.9 |
| Average | | 0.0 | 28.3 | 40.7 | 31.0 | 18.4 |
| Sample 5 | PMA/4% lp | 50.0 | 12.5 | 17.7 | 69.7 | 44.5 |
| Sample 6 | PMA/4% lp | 50.0 | 6.7 | 27.0 | 66.3 | 49.8 |
| Sample 7 | PMA/4% lp | 50.0 | 6.1 | 3.0 | 90.9 | 63.8 |
| Average | | 0.0 | 28.3 | 40.7 | 31.0 | 18.4 |

Part = particle size
PMA = poly(methacrylic) acid
bp = benzoyl peroxide
lp = lauroyl peroxide
PMA* = poly(methacrylic) acid initiated by persulfate
PMA/4% bp, for example, represents poly(methacrylic) acid initiated by 4% benzoyl peroxide The PMA/bp was significantly better than PMA* measured both by the percentage of iron as small particles and the total removal of the autoclave. For PMA/bp, the performance of the material improved with increased bp percentage used during the polymerization (samples 2, 3 and 4). The PMA/lp samples also exhibited better performance than PMA* based on total percentage iron removed.

PMA/4% bp (sample 2) was examined in the ADT as a function of concentration. This material showed better performance than PMA* over the entire range of concentrations tested (see Table II).

RESEARCH BOILER TESTS

Evaluations of deposit inhibition efficacy were conducted in electric-fired model steam generators in a coordinated phosphate/pH (PPH) test program at 1450, 1800, 2200 and 2500 psig. At 1450 psig, the boilers run for 15 cycles with 376 W/in$^2$ heated probes. The feedwater used contained 1.7 ppm $PO_4^{-3}$ (added as $Na_3PO_4$ and $NaH_2PO_4$) and 5 ppm iron (added as $FeSO_4$). At 1800 to 2500 psig, the runs were performed for 50 cycles with 325 w/in$^2$. The feedwater used contained approximately 0.1 to 0.5 ppm $PO_4^{-3}$ (added as $Na_3PO_4$ and $NaH_2PO_4$) and 0.5 ppm iron (added as $Fe(NO_3)_2$). Small amounts of caustic were sometimes added to the feedwater in order to maintain the boiler water pH.

A typical experiment consisted of operating the model steam generator for 44 hours while maintaining the pressure, cycles of operation and feedwater concentrations of dissolved solids and treatment chemicals at their desired levels. After 44 hours, deposit weight density (DWD) was determined by removing the deposit from the heated surfaces by soaking in an acid solution of either 5% $H_2SO_4$ or HCl and then scraped mechanically. The composition and weight of the deposit are then determined analytically.

The data shown below were obtained in research boilers, where the length of the experiment is usually less than the time that a typical industrial boiler is operated between shutdown.

It is thus to be understood that the deposits found in typical industrial boilers can be made many times the magnitude of deposits generated in a research boiler experiment, and that the improvements achieved by the present invention could be even more dramatic in an operating boiler.

RESEARCH BOILER RESULTS

Tables III A, III B, IV A, IV B, IV C and V present these results. Low deposit weight densities (DWDS) are indicative of good dispersant efficacy. Tables III A & B evaluate poly(methacrylic) acid (PMA*) that was initiated by persulfate by measuring boiler deposit composition and boiler blowdown composition. Tables IVA, B & C evaluate poly(methacrylic) acid that was initiated by benzoyl peroxide as per boiler deposit composition and boiler blowdown composition.

TABLE III A

Poly(methacrylic) acid initiated by persulfate (PMA*) in a 1450 psig coordinated phosphate/pH program
5 ppm Fe Feedwater at 15 cycles
BOILER DEPOSIT COMPOSITION

| Run No. | ppm PMA* | DWD g/ft$^2$ | Fe g/ft$^2$ | PO$_4$ g/ft$^2$ | SiO$_2$ g/ft$^2$ | TH g/ft$^2$ |
|---|---|---|---|---|---|---|
| 1 | 0.0 | 4.41 | 2.18 | 1.41 | 0.00 | 0.63 |
| 2 | 0.0 | 5.59 | 4.75 | 0.57 | 0.00 | 0.22 |
| 3 | 0.0 | 4.52 | 3.15 | 0.89 | 0.00 | 0.47 |
| 4 | 0.0 | 5.83 | 4.32 | 1.10 | 0.00 | 0.41 |
| 5 | 2.5 | 1.28 | 1.25 | 0.01 | 0.00 | 0.01 |
| 6 | 3.0 | 3.09 | 2.49 | 0.27 | 0.03 | 0.30 |
| 7 | 5.0 | 1.92 | 1.75 | 0.10 | 0.00 | 0.07 |
| 8 | 5.0 | 0.27 | 0.27 | 0.00 | 0.00 | 0.00 |
| 9 | 7.5 | 0.57 | 0.55 | 0.01 | 0.00 | 0.01 |
| 10 | 7.5 | 2.12 | 1.26 | 0.43 | 0.00 | 0.42 |
| 11 | 10.0 | 0.73 | 0.59 | 0.06 | 0.00 | 0.08 |
| 12 | 10.0 | 0.65 | 0.00 | 0.00 | 0.00 | 0.00 |
| 13 | 20.0 | 0.63 | 0.52 | 0.05 | 0.00 | 0.03 |

TABLE III B

Poly(methacrylic) acid initiated by persulfate (PMA*) in a
1450 psig coordinated phosphate/pH program
5 ppm Fe Feedwater at 15 cycles
BOILER BLOWDOWN COMPOSITION

| Run No. | ppm PMA* | DWD g/ft² | Fe ppm | PO₄ ppm | SiO₂ ppm | TH ppm |
|---|---|---|---|---|---|---|
| 1 | 0.0 | 4.41 | 3.2 | 4.6 | 0.0 | 6.6 |
| 2 | 0.0 | 5.59 | 1.9 | 4.6 | 0.0 | 1.7 |
| 3 | 0.0 | 4.52 | 3.0 | 2.2 | 0.0 | 2.7 |
| 4 | 0.0 | 5.83 | 11.5 | 8.5 | | 2.6 |
| 5 | 2.5 | 1.28 | 0.6 | 16.5 | | 0.8 |
| 6 | 3.0 | 3.09 | 0.6 | 2.5 | 3.9 | 0.0 |
| 7 | 5.0 | 1.92 | 5.7 | 10.7 | 0.0 | 0.0 |
| 8 | 5.0 | 0.27 | 7.1 | 13.0 | 10.0 | 0.0 |
| 9 | 7.5 | 0.57 | 7.20 | 12.0 | 4.90 | 1.60 |
| 10 | 7.5 | 2.12 | | | | |
| 11 | 10.0 | 0.73 | 6.8 | 12.9 | | 1.9 |
| 12 | 10.0 | 0.65 | | | | |
| 13 | 20.0 | 0.63 | 6.8 | 8.9 | 0.0 | 1.7 |

TABLE IV A

Poly(methacrylic) acid initiated by benzoyl peroxide in
a 1450 psig coordinated phosphate/pH program
5 ppm Fe Feedwater at 15 cycles
BOILER DEPOSIT COMPOSITION

| Sample No. | Mole % BPO | Visc. CPS | ppm | DWD g/ft² | Fe g/ft² | PO₄ g/ft² | SiO₂ g/ft² | TH g/ft² |
|---|---|---|---|---|---|---|---|---|
| 2 | 4.0 | 112.2 | 3.7 | 1.37 | 1.31 | 0.02 | 0.00 | 0.05 |
| 3 | 3.0 | 152.2 | 3.7 | 1.76 | 1.73 | 0.01 | 0.00 | 0.02 |
| 4 | 2.0 | 205.5 | 3.7 | 2.15 | 2.06 | 0.05 | 0.01 | 0.02 |
| 1 | 2.0 | 230.5 | 3.0 | 1.73 | 1.61 | 0.07 | 0.00 | 0.05 |
| 1 | 2.0 | 230.5 | 7.5 | 1.18 | 0.59 | 0.39 | 0.01 | 0.18 |
| 1 | 2.0 | 230.5 | 7.5 | 1.46 | 1.35 | 0.06 | 0.01 | 0.04 |
| 1 | 2.0 | 230.5 | 15.0 | 0.22 | 0.17 | 0.02 | 0.00 | 0.01 |

TH = Total Hardness

TABLE IV B

Poly(methacrylic) acid initiated by benzoyl peroxide in a
1450 psig coordinated phosphate/pH program
5 ppm Fe Feedwater at 15 cycles
BOILER BLOWDOWN (BLD) COMPOSITION

| Sample No. | Mole % BPO | Visc. CPS | Feed ppm | DWD g/ft² | BLD pH | BLD uS |
|---|---|---|---|---|---|---|
| 2 | 4.0 | 112.2 | 3.7 | 1.37 | 11.2 | 1142 |
| 3 | 3.0 | 152.2 | 3.7 | 1.76 | 11.0 | 1085 |
| 4 | 2.0 | 205.5 | 3.7 | 2.15 | 10.8 | 1405 |
| 1 | 2.0 | 230.5 | 3.0 | 1.73 | 10.6 | 627 |
| 1 | 2.0 | 230.5 | 7.5 | 1.18 | 9.7 | 629 |
| 1 | 2.0 | 230.5 | 7.5 | 1.46 | 10.6 | 671 |
| 1 | 2.0 | 230.5 | 15.0 | 0.22 | — | — |

TABLE IV C

Poly(methacrylic) acid initiated by benzoyl peroxide in a
1450 psig coordinated phosphate/pH program
5 ppm Fe Feedwater at 15 cycles
BOILER BLOWDOWN (BLD) COMPOSITION

| Sample No. | Fe ppm | PO₄ ppm | SiO₂ ppm | TH ppm |
|---|---|---|---|---|
| 2 | 0.43 | 27.0 | 6.90 | — |
| 3 | 0.16 | 26.0 | 9.00 | 1.80 |
| 4 | 0.25 | 158.0 | — | 8.30 |
| 1 | 0.92 | 14.7 | 0.00 | 0.00 |
| 1 | 0.74 | 3.0 | 3.50 | 0.55 |
| 1 | 1.70 | 13.2 | 4.50 | 1.50 |
| 1 | 8.90 | 13.9 | 4.20 | 0.50 |

At a feedrate of 3.0–3.7 ppm active in the boiler water, the DWD's for the PMA materials synthesized with bp were lower than those of the PMA initiated by persulfate. In general, the DWD's were lower as the percentage of bp used in the synthesis increased.

In Table IV A and IV B, the DWD's were determined as a function of polymer concentration for Sample 1 in the 1450 psig coordinated phosphate/pH program. Within experimental uncertainty, the DWD's for this sample were equivalent to PMA initiated by persulfate under these test conditions.

TABLE V

High Pressure Coordinated Phosphate Program
0.5 ppm Fe in Feedwater at 50 cycles

| Sample No. | Pressure psig | ppm | Fe DWD g/ft² | Fe DWD % | Fe BLD ppm |
|---|---|---|---|---|---|
| — | 1800 | 0.0 | 0.31 | 2.3 | 0.01–0.03 |
|   | 1800 | 0.0 | 0.15 | 1.5 | 0.06–0.26 |
| 1 | 1800 | 21 | 0.01 | 0.04 | <0.05 |
| — | 2500 | 0.0 | 0.73 | 4.5 | 0.03–0.14 |
| 1 | 2500 | 23 | 0.06 | 0.31 | 0.19–0.26 |

Table V shows the DWD's for Sample 1 in an 1800 psig and 2500 psig coordinated phosphate/pH program. It is believed that this better efficacy of the bp initiated polymer at high pressures is the result of improved thermal and chemical stability due to incorporating the benzoyl and lauroyl end groups.

THERMAL DECOMPOSITION TESTS

Research boiler experiments were performed whereby the poly (methacrylic acid) initiated by benzoyl and lauroyl peroxide and comparative polymers were shot-fed into the boiler and the blowdown and steam condensate analyzed for the decomposition products. The rate constants (k) for the process were estimated assuming a first order kinetic process.

Concentration of intact polymer in boiler water $= A \times \mathrm{Exp}(-k \times t)$ at time 't' after shot feed) where A is the polymer concentration at time t = 0. Larger values of k correspond to higher rates of thermal decomposition. The results of these tests are shown in Table VI.

TABLE VI

Rate of thermal decomposition of polymers (k × 1000)
as a function of boiler operating pressure at 50 cycles of operation.

| Polymer | 1450 psig | 1800 psig | 2200 psig | 2500 psig |
|---|---|---|---|---|
| PMA * | <1.0 | — | 2.0 | — |
| PMA/4% BPO | <1.0 | <5.0 | 2.6 | 2.6 |
| PAA * | 1.5 | 2.5 | 3.5 | 6.0 |
| PAA/4% BPO | <1.0 | 2.0 | 4.0 | 4.0 |
| MA/AA | 2.0 | — | 7.0 | — |

PMA * = poly(methacrylic acid) initiated by persulfate
PMA/4% BPO = poly(methacrylic acid) initiated by 4% benzoyl peroxide
PAA = poly(acrylic acid) initiated by persulfate
PAA/4% BPO = poly(acrylic acid) initiated by 4% benzoyl peroxide
MA/AA = methacrylic acid/acrylic acid copolymer As can be seen in Table VI, both the PMA compounds are more thermally stable than the PAA compounds.

In accordance with the patent statutes, the best mode of practicing the invention has been herein set forth. However, it will be apparent to those skilled in the art that many modifications can be made in the methods herein disclosed without departing from the spirit of the invention.

Having thus described the invention what we claim is:

1. A method of controlling the formation and deposition of materials including soluble salts of iron, calcium and magnesium on the structural parts of a boiler system containing an aqueous medium, which materials would deposit and/or form and deposit under steam generating conditions, which method comprises adding to said aqueous medium a sufficient amount for the purpose of a dispersant comprised of a methacrylic acid homopolymer having benzoyl or lauroyl groups incorporated on the homopolymer, wherein the polymerization of said homopolymer is initiated by one of benzoyl peroxide and lauroyl peroxide in a range of about one to four percent initiator per mole of monomer.

2. A method as described in claim 1 wherein said homopolymer is added to said boiler system in an amount from about 1.0 ppm to about 1000 ppm.

3. A method as described in claim 2 wherein said homopolymer is added to said boiler system in an amount from about 5.0 ppm to about 100 ppm.

* * * * *